United States Patent
Chang et al.

(10) Patent No.: US 12,079,414 B2
(45) Date of Patent: Sep. 3, 2024

(54) METHOD FOR DRIVING TOUCH PANEL AND RELATED TOUCH CONTROL CIRCUIT

(71) Applicant: NOVATEK Microelectronics Corp., Hsin-Chu (TW)

(72) Inventors: Tsen-Wei Chang, Taichung (TW); Wing-Kai Tang, Hsinchu (TW); Shih-Chi Lin, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 121 days.

(21) Appl. No.: 17/474,081

(22) Filed: Sep. 14, 2021

(65) Prior Publication Data
US 2023/0079469 A1    Mar. 16, 2023

(51) Int. Cl.
*G06F 3/041*    (2006.01)
(52) U.S. Cl.
CPC .......... *G06F 3/0416* (2013.01); *G06F 3/0412* (2013.01)

(58) Field of Classification Search
CPC .. G06F 3/0416; G06F 3/04184; G06F 3/0412; G06F 3/04166
See application file for complete search history.

(56) References Cited

U.S. PATENT DOCUMENTS

| | | | |
|---|---|---|---|
| 2011/0163984 A1* | 7/2011 | Aono | G06F 3/0416 345/173 |
| 2013/0063372 A1* | 3/2013 | Hong | G06F 3/0416 345/173 |
| 2018/0188882 A1* | 7/2018 | Kang | G06F 3/04184 |
| 2022/0057898 A1* | 2/2022 | Lee | H10K 59/40 |

FOREIGN PATENT DOCUMENTS

| | | |
|---|---|---|
| CN | 106933405 A | 7/2017 |
| TW | 201537398 A | 10/2015 |
| TW | 201715357 A | 5/2017 |

* cited by examiner

*Primary Examiner* — Yaron Cohen
(74) *Attorney, Agent, or Firm* — Winston Hsu (57) ABSTRACT

A method for driving a touch panel includes applying a touch driving signal to the touch panel for touch sensing, wherein an amplitude of the touch driving signal rises and falls gradually.

7 Claims, 11 Drawing Sheets

METHOD FOR DRIVING TOUCH PANEL AND RELATED TOUCH CONTROL CIRCUIT

BACKGROUND OF THE INVENTION

1. Field of the Invention

The present invention relates to a touch driving technique, and more particularly, to a method for driving a touch panel and a related touch control circuit.

2. Description of the Prior Art

In recent years, the application of touch panels has been gradually involved in the field of automotive electronics. Due to the safety issue of the vehicle driver, the electromagnetic interference (EMI) problem should be considered more carefully for the touch panel products in the automotive electronics. In addition, modern touch panels usually apply the touch and display driver integration (TDDI) technology, where the touch driving signals may be applied together with load-free driving signals. In other words, signals having the same phase, amplitude and frequency are applied to all control lines and elements on the touch panel, so as to reduce the loads caused by parasitic capacitors on the panel. However, simultaneous output of the touch driving signals and the load-free driving signals may exacerbate the EMI problem.

Figure 1:
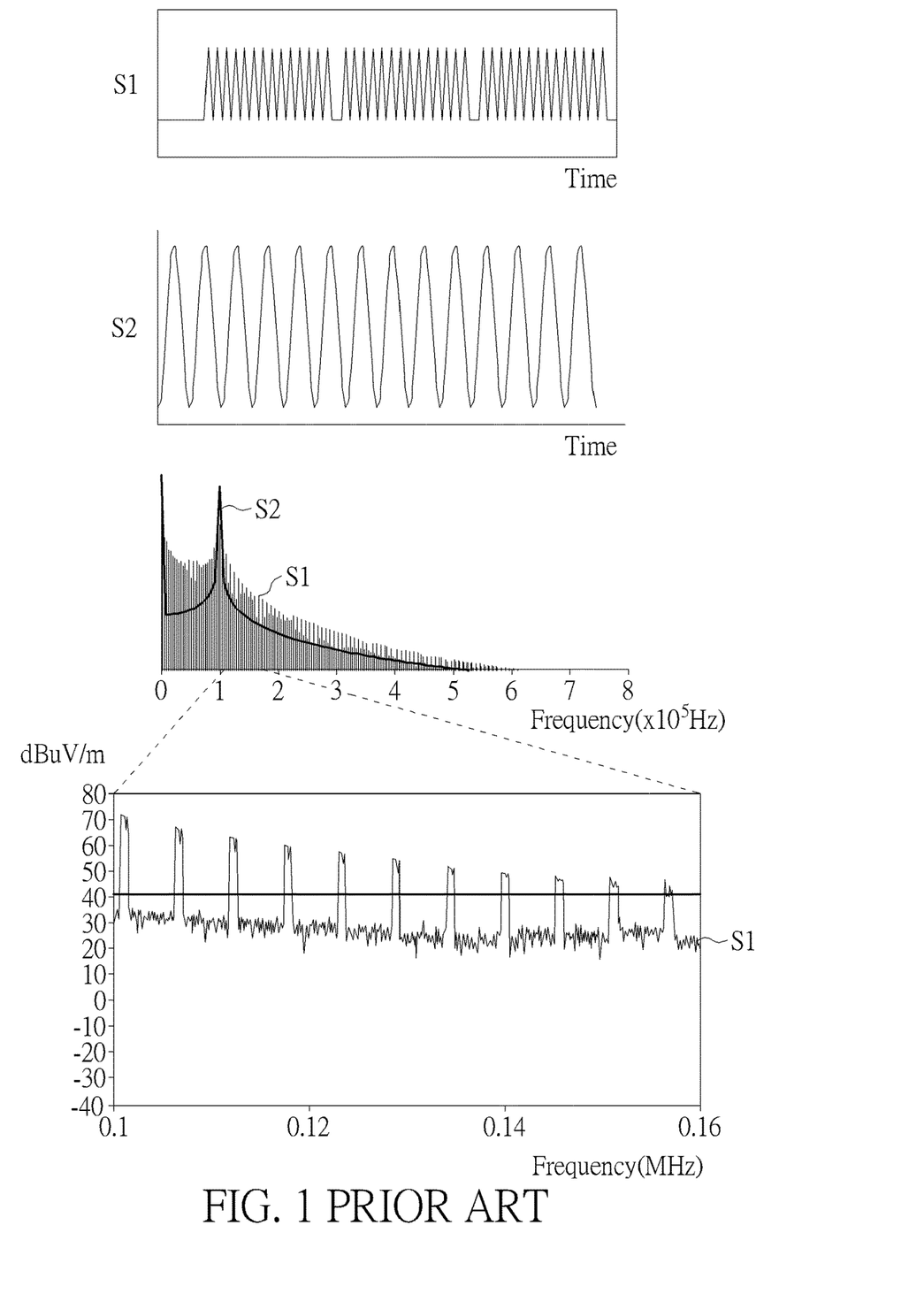
FIG. 1 is a waveform diagram of a pattern of the touch driving signal and its frequency spectrum distribution.

Please refer to FIG. 1, which is a waveform diagram of a pattern of the touch driving signal and its frequency spectrum distribution. As shown in FIG. 1, the touch driving signal S1 has several sections of sinusoidal signals each separated with a small time gap. As for a pure sinusoidal signal S2, the spectrum distribution may appear to have a high peak at the signal frequency and low magnitude at other frequencies. However, if multiple sections of sinusoidal signals are included when a longer term is considered, the spectrum distribution may become more complex and spread over a larger frequency range. As shown in the bottommost figure of FIG. 1, suppose that the region of interest (ROI) in the frequency domain is from 0.1 MHz to 0.16 MHz (where the spectrum distribution is amplified in this figure), and the strength of EMI is requested to be lower than 40 dBuV/m in this ROI. Even though the frequency of sinusoidal signal swing is lower than the ROI frequency, the touch driving signal S1 in the long term may still generate several energy peaks beyond the threshold of EMI requirements.

Thus, there is a need to provide a novel touch driving technique, in order to reduce the EMI caused by the touch driving signal.

SUMMARY OF THE INVENTION

It is therefore an objective of the present invention to provide a method for driving a touch panel and a related touch control circuit, so as to solve the abovementioned problems.

An embodiment of the present invention discloses a method for driving a touch panel. The method comprises applying a touch driving signal to the touch panel for touch sensing. Wherein, an amplitude of the touch driving signal rises and falls gradually.

Another embodiment of the present invention discloses a touch control circuit, which comprises a digital control circuit and a digital-to-analog converter (DAC). The digital control circuit is configured to generate a series of data codes. The DAC, coupled to the digital control circuit, is configured to convert the series of data codes into a touch driving signal. Wherein, an amplitude of the touch driving signal rises and falls gradually.

Another embodiment of the present invention discloses a touch control circuit, which comprises a pulse generator, a voltage selector and a voltage switching circuit. The pulse generator is configured to generate a pulse signal having a series of first pulses. The voltage selector is configured to output a plurality of voltage select signals. The voltage switching circuit, coupled to the pulse generator and the voltage selector, is configured to receive the pulse signal and the plurality of voltage select signals, to generate a touch driving signal having a series of second pulses, wherein a voltage level of each of the series of second pulses is determined according to one of the plurality of voltage select signals. Wherein, an amplitude of the touch driving signal rises and falls gradually.

These and other objectives of the present invention will no doubt become obvious to those of ordinary skill in the art after reading the following detailed description of the preferred embodiment that is illustrated in the various figures and drawings.

DETAILED DESCRIPTION

In order to reduce the electromagnetic interference (EMI) generated from the touch driving signal, the waveform of the touch driving signal may be modified, so that the amplitude of the touch driving signal rises and falls gradually. More specifically, during a time period where a touch driving signal is output, the amplitude of the touch driving signal may rise gradually in the front part of the time period and fall gradually in the back part of the time period.

Figure 2:
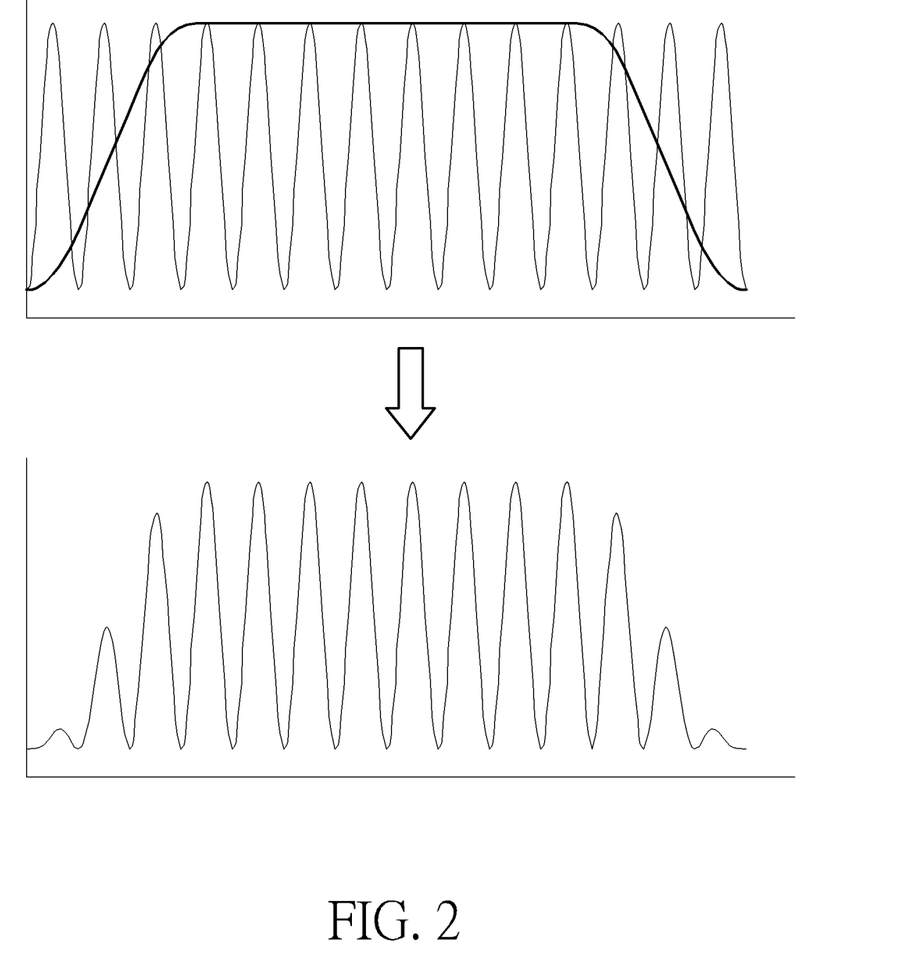
FIG. 2 is a waveform diagram of the touch driving signal according to an embodiment of the present invention.

Please refer to FIG. 2, which is a waveform diagram of the touch driving signal according to an embodiment of the present invention. As shown in FIG. 2, a general sinusoidal signal is combined with an envelope to generate the touch driving signal. In detail, in the touch driving signal, the first sinusoidal wave has the minimum level, the next one rises to a higher level, and so on, until the maximum amplitude. The amplitude of the sinusoidal waves then falls in a symmetric manner, to achieve the minimum level on the last one.

Please note that the sinusoidal signal with gradually rising and falling amplitude is one of various implementations of the present invention. In another embodiment, the touch driving signal may be composed of square waves, triangular waves, or any other types of periodic swing signals, but not limited thereto. As long as the signal swings have different levels to realize gradually rising and falling amplitude, the signal pattern can be feasible in the touch driving signal of the present invention.

Figure 3:
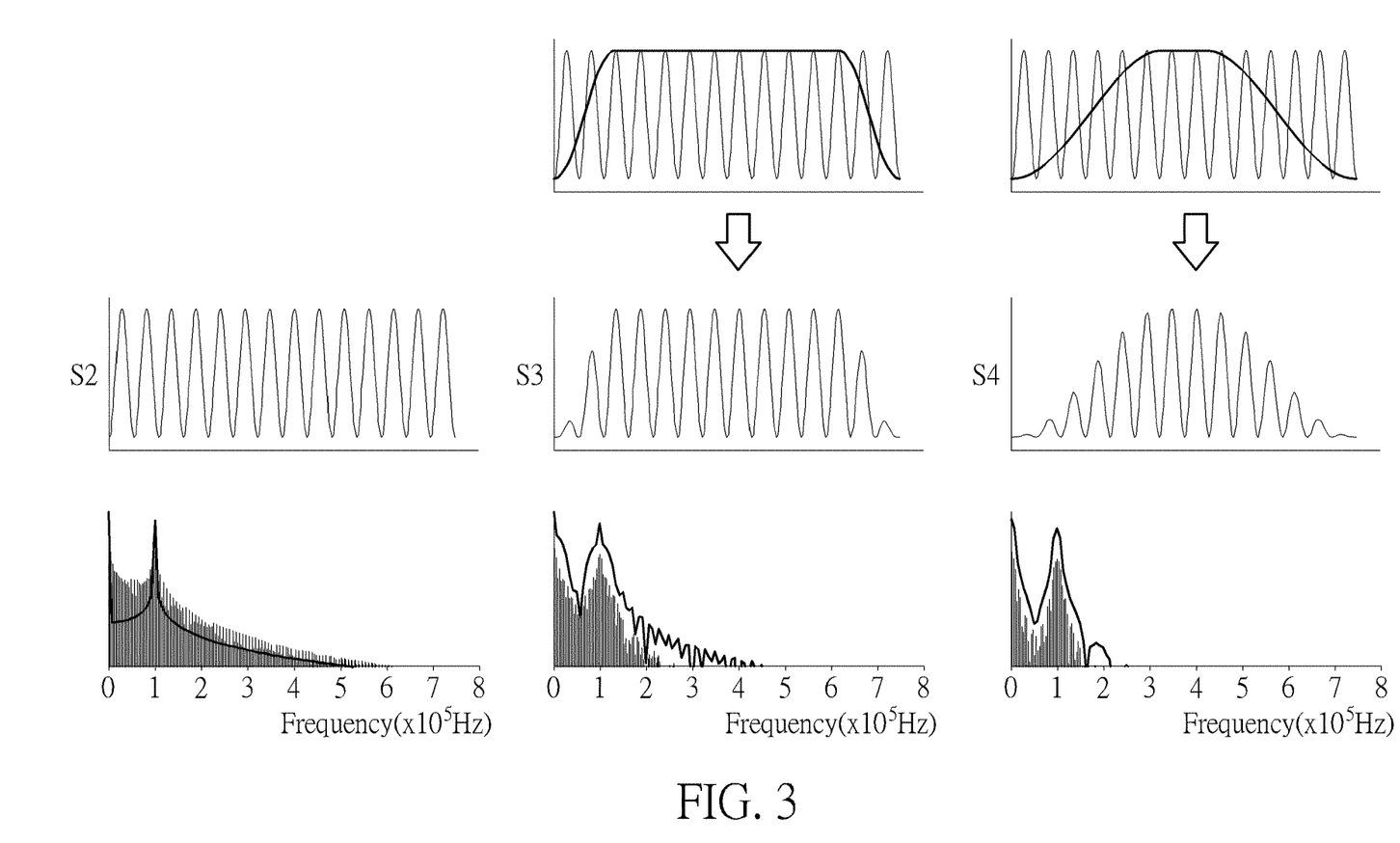
FIG. 3 is a waveform diagram of the comparison of touch driving signals and their corresponding frequency spectrum distribution.

Please refer to FIG. 3, which is a waveform diagram of the comparison of touch driving signals and their corresponding frequency spectrum distribution. As shown in FIG. 3, the touch driving signals S3 and S4 having gradually rising and falling amplitude are compared with the conventional sinusoidal signal S2 as shown in FIG. 1. As mentioned above, the spectrum distribution of the sinusoidal signal S2 with several time gaps may spread over a larger frequency range. In contrast, the electromagnetic energies of the touch driving signal S3 with gradually rising and falling amplitude are smaller than those of the sinusoidal signal S2, especially at higher frequencies. As for the touch driving signal S4 in which the amplitude rises and falls more slowly, the electromagnetic energies are smaller and more concentrate on the frequency of signal swing. In such a situation, the EMI problem may be mitigated by reshaping the touch driving signal to have gradually and slowly rising and falling amplitude. If the amplitude of the touch driving signal rises and/or falls more slowly, the performance of EMI reduction will be more preferable.

Note that the envelope that forms the rising and falling of the signal amplitude may be realized in any manner. In the present invention, the envelope for reshaping the touch driving signal may follow the function such as the Hanning window, Hamming window, Blackman window, or ramp signal, but is not limited thereto.

Figure 4:
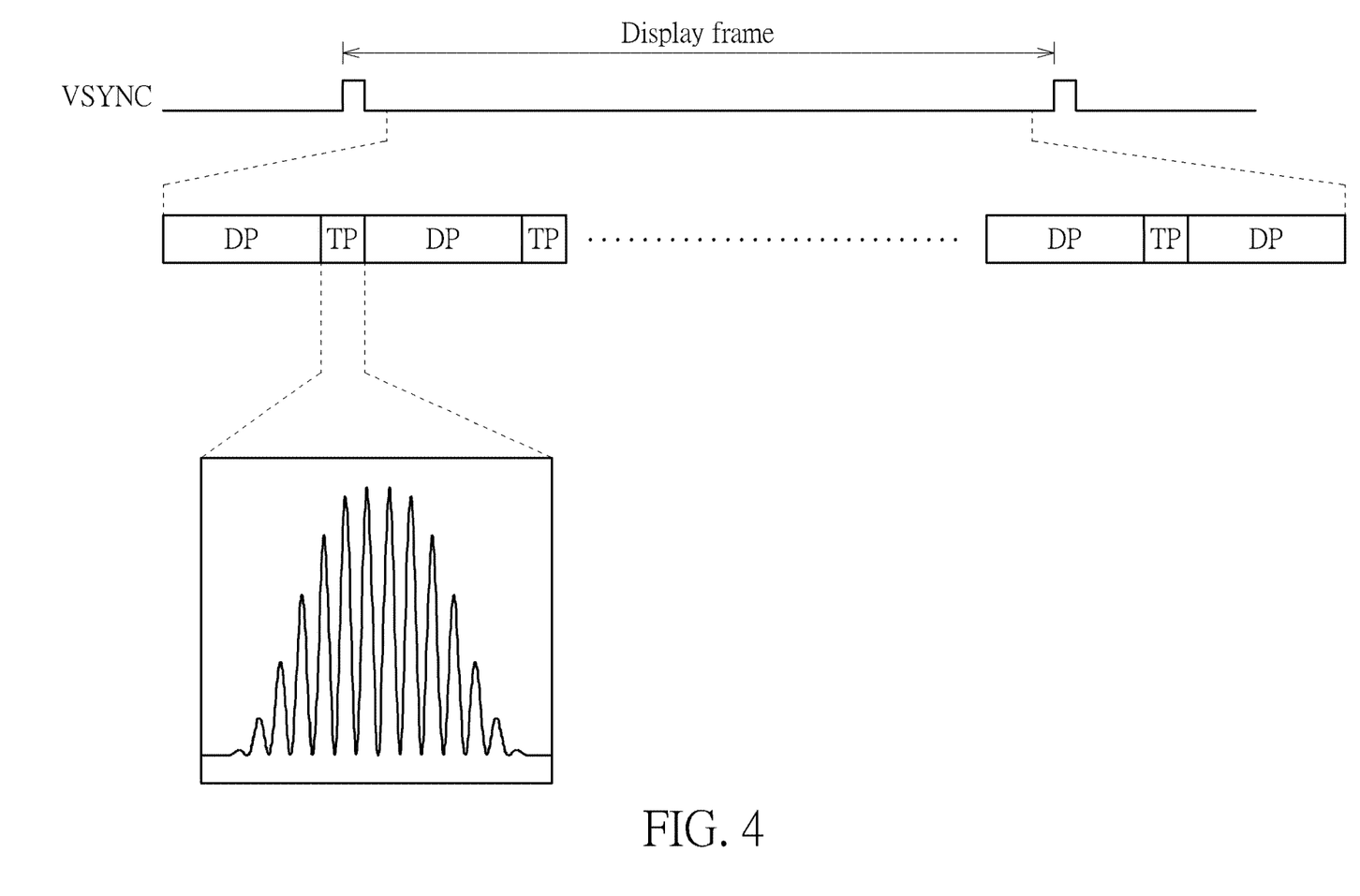
FIGS. 4-7 are schematic diagrams of a pattern of the touch driving signal according to an embodiment of the present invention.

Please refer to FIG. 4, which is a schematic diagram of a pattern of the touch driving signal according to an embodiment of the present invention. As shown in FIG. 4, the touch driving signal may be applied to a touch panel integrated with display and touch functions, in order to perform touch sensing on the touch panel. In general, the display and touch are performed based on time division, and a display frame time (controlled through the VSYNC signal) may be divided into one or more display periods DP and one or more touch periods TP. The display periods DP are those periods in which display data are output to the panel, while the touch driving signal is output in the touch periods TP. FIG. 4 shows the long H-blank mode, where the touch periods TP are allocated in the H-blank intervals. The touch panel may include an array of touch sensing electrodes, and the touch driving signal in a touch period TP may be sent to one or more touch sensing electrodes. As shown in FIG. 4, the touch driving signal in a touch period TP may have variable amplitude, where the amplitude rises gradually and slowly in the front part of the touch period TP and falls gradually and slowly in the back part of the touch period TP.

Figure 5:
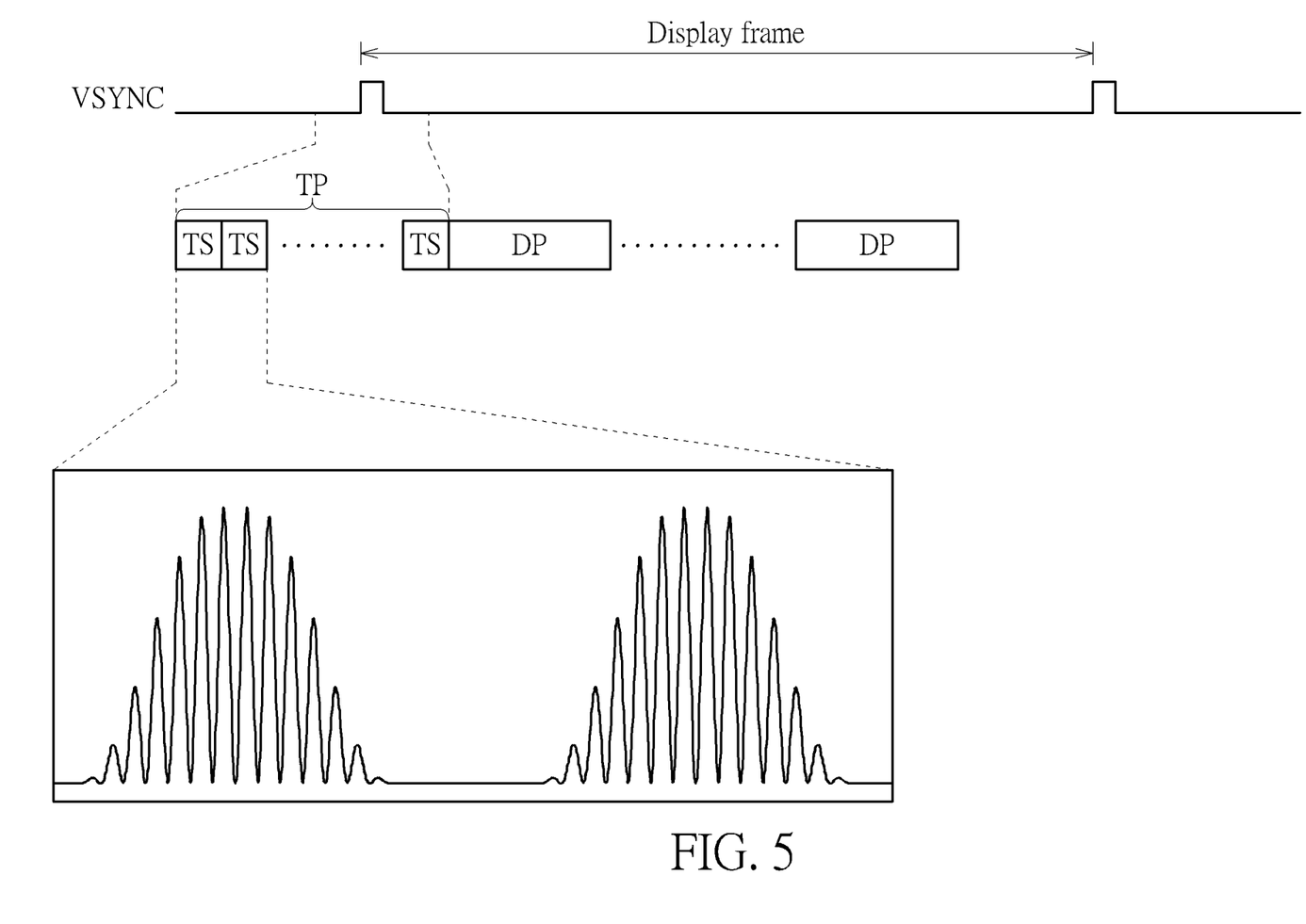

Please refer to FIG. 5, which is a schematic diagram of another pattern of the touch driving signal according to an embodiment of the present invention. In this embodiment, the touch panel is operated in the long V-blank mode, where the touch period TP is allocated in the V-blank interval. As shown in FIG. 5, the touch period TP includes multiple time slots TS, where each time slot TS is allocated to send a touch driving signal to one or more touch sensing electrodes, and all touch sensing electrodes on the panel may be fully scanned in one or more touch periods TP. The touch driving signal in a time slot TS of the touch period TP may have variable amplitude, where the amplitude rises gradually and slowly in the front part of the time slot TS and falls gradually and slowly in the back part of the time slot TS.

Figure 6:
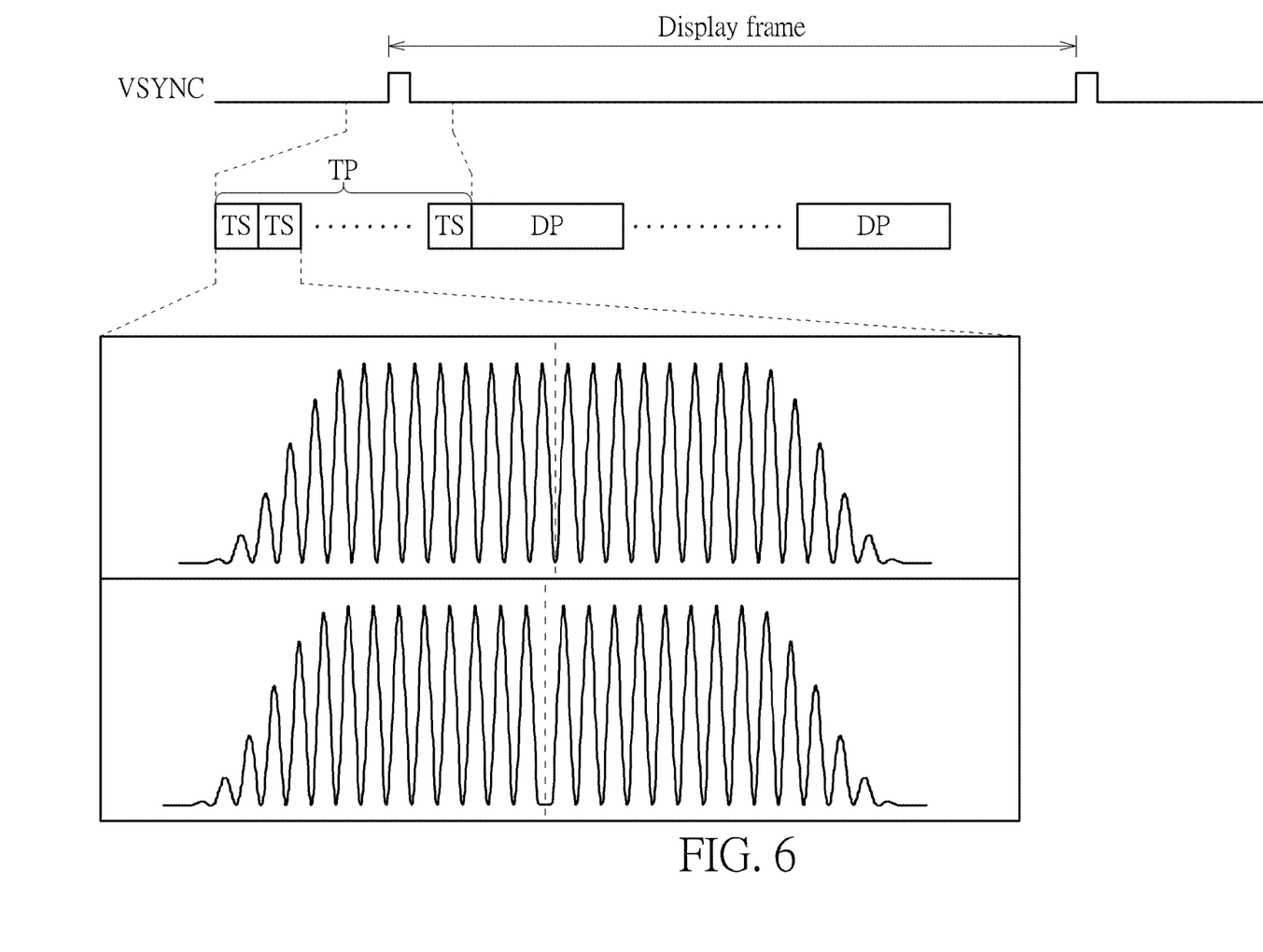

In another embodiment, one envelope for generating the rising and falling amplitude may be applied to multiple time slots TS, as shown in FIG. 6. In this embodiment, there may be one or more touch driving signals output in two consecutive time slots TS to be reshaped with the same envelope, where the amplitude rises gradually and slowly in the first time slot TS, keeps on the maximum level, and then falls gradually and slowly in the second time slot TS. The touch driving signal (s) in these consecutive time slots TS may be sent to the same or different touch sensing electrodes. Note that the sinusoidal waves of the touch driving signals may swing continuously across the time slots TS, or the touch driving signals may have a gap on the boundary between the time slots TS, as shown in FIG. 6. In another embodiment, the touch driving signal(s) in three or more time slots TS may be reshaped with the same envelope, and the number of time slots TS corresponding to the envelope should not be a limitation of the present invention.

Figure 7:
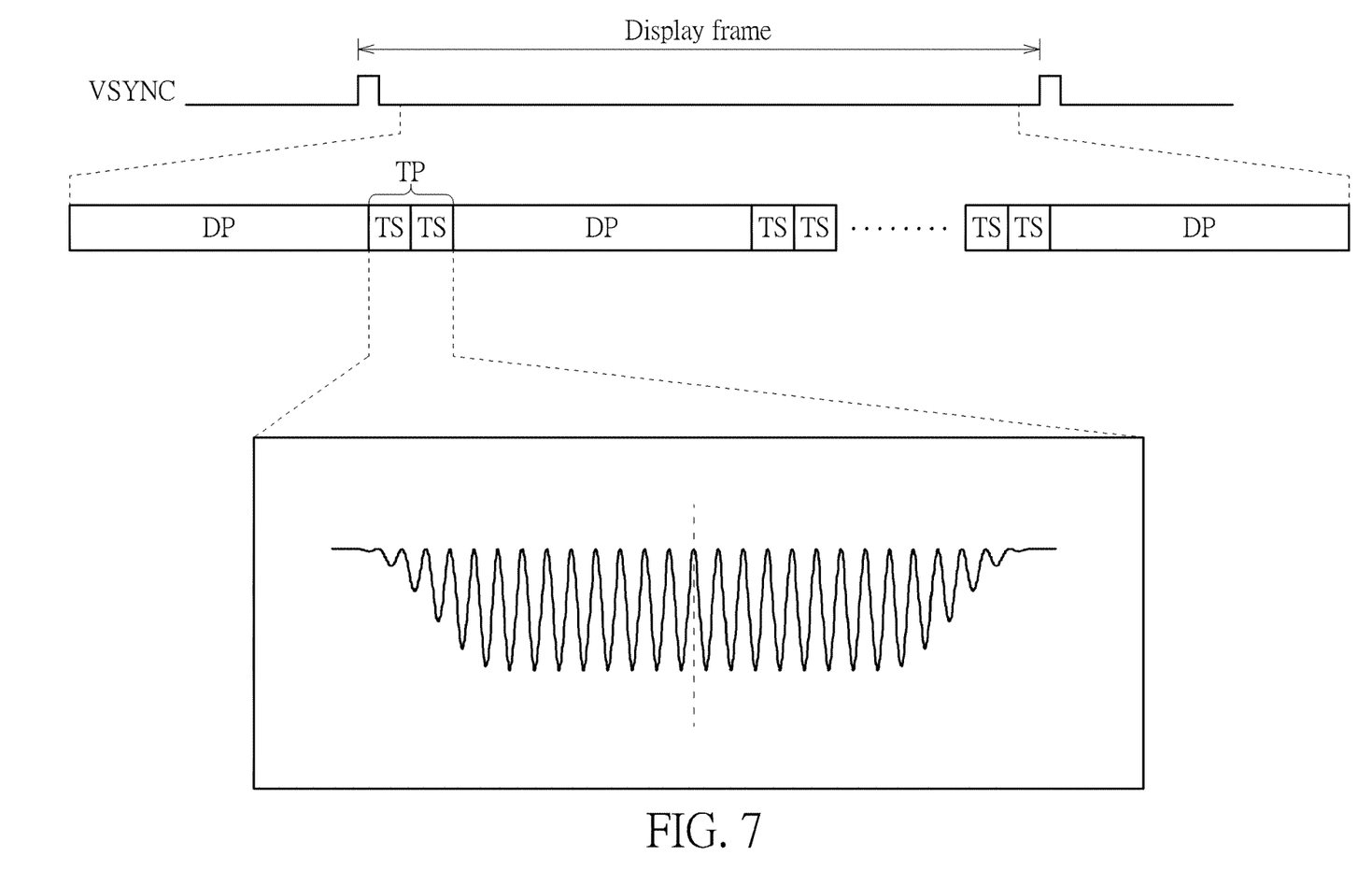

Please refer to FIG. 7, which is a schematic diagram of a further pattern of the touch driving signal according to an embodiment of the present invention. As shown in FIG. 7, the touch driving signal is a negative voltage signal, which may also be reshaped in a similar manner to realize gradually rising and falling amplitude in the negative voltage level. In such a situation, the amplitude of the touch driving signal falls gradually in the front part of the time period TP and rises gradually in the back part of the time period TP. Note that the implementations of touch driving signals in all the above embodiments may also be realized in the negative voltage domain.

In another embodiment, the touch driving signals in a touch period may include positive voltage in a period and negative voltage in another period. As long as the amplitude of the signal swing may increase and/or decrease gradually and slowly so as to reduce the EMI energies of the touch driving signal, the related driving method should belong to the scope of the present invention.

Figure 8:
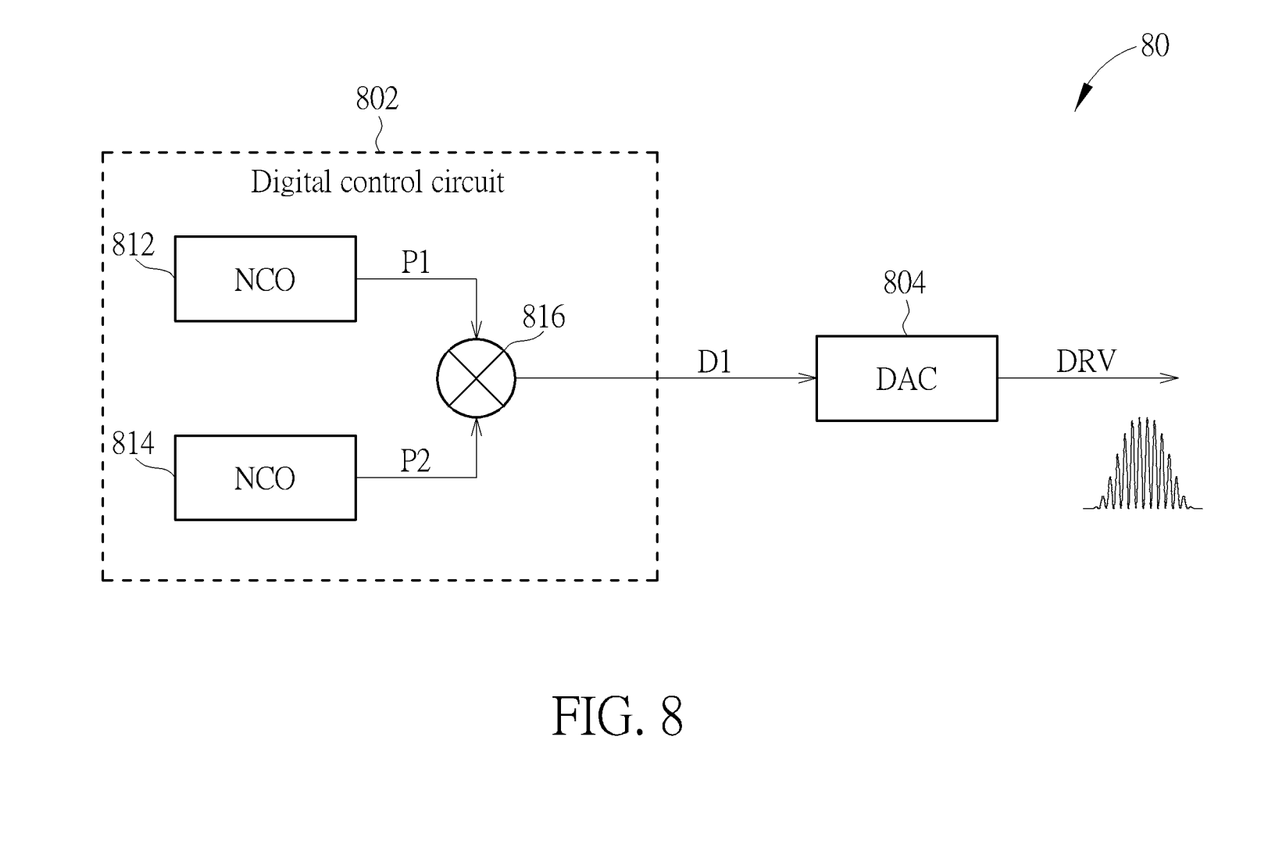
FIGS. 8-10 are schematic diagrams of a touch control circuit according to an embodiment of the present invention.

Please refer to FIG. 8, which is a schematic diagram of a touch control circuit 80 according to an embodiment of the present invention. As shown in FIG. 8, the touch control circuit 80 includes a digital control circuit 802 and a digital-to-analog converter (DAC) 804. The digital control circuit 802 is configured to generate a series of data codes D1. The DAC 804 is configured to convert the data codes D1 into a touch driving signal DRV. More specifically, the data codes D1 output from the digital control circuit 802 may include a series of discrete values representing a waveform having high-frequency signal swing with gradually rising and falling amplitude, as the waveform of the desired touch driving signal DRV. The DAC 804 thereby converts the discrete values into the touch driving signal DRV.

The data codes D1 may be generated by using the numerically controlled oscillator (NCO), which is capable of creating discrete values that represent a periodic signal such as a sinusoidal signal. In an embodiment, the digital control circuit 802 may include two NCOs 812 and 814 and a multiplier 816, as shown in FIG. 8. The NCO 812 may generate and output a discrete periodic signal P1, which includes discrete values representing a high-frequency signal that constructs the signal swing of the touch driving signal DRV. The NCO 814 may generate and output another discrete periodic signal P2, which includes discrete values representing an envelope for reshaping the amplitude of the touch driving signal DRV, where the envelope may be a sinusoidal signal having a lower frequency, i.e., lower than the frequency of the signal swing of the touch driving signal DRV. The multiplier 816 is coupled to the output terminal of the NCOs 812 and 814, and configured to multiply the discrete periodic signals P1 and P2 to generate the data codes D1, so that the data codes D1 may include a series of discrete values representing the waveform having high-frequency signal swing with gradually rising and falling amplitude based on the envelope.

Figure 9:
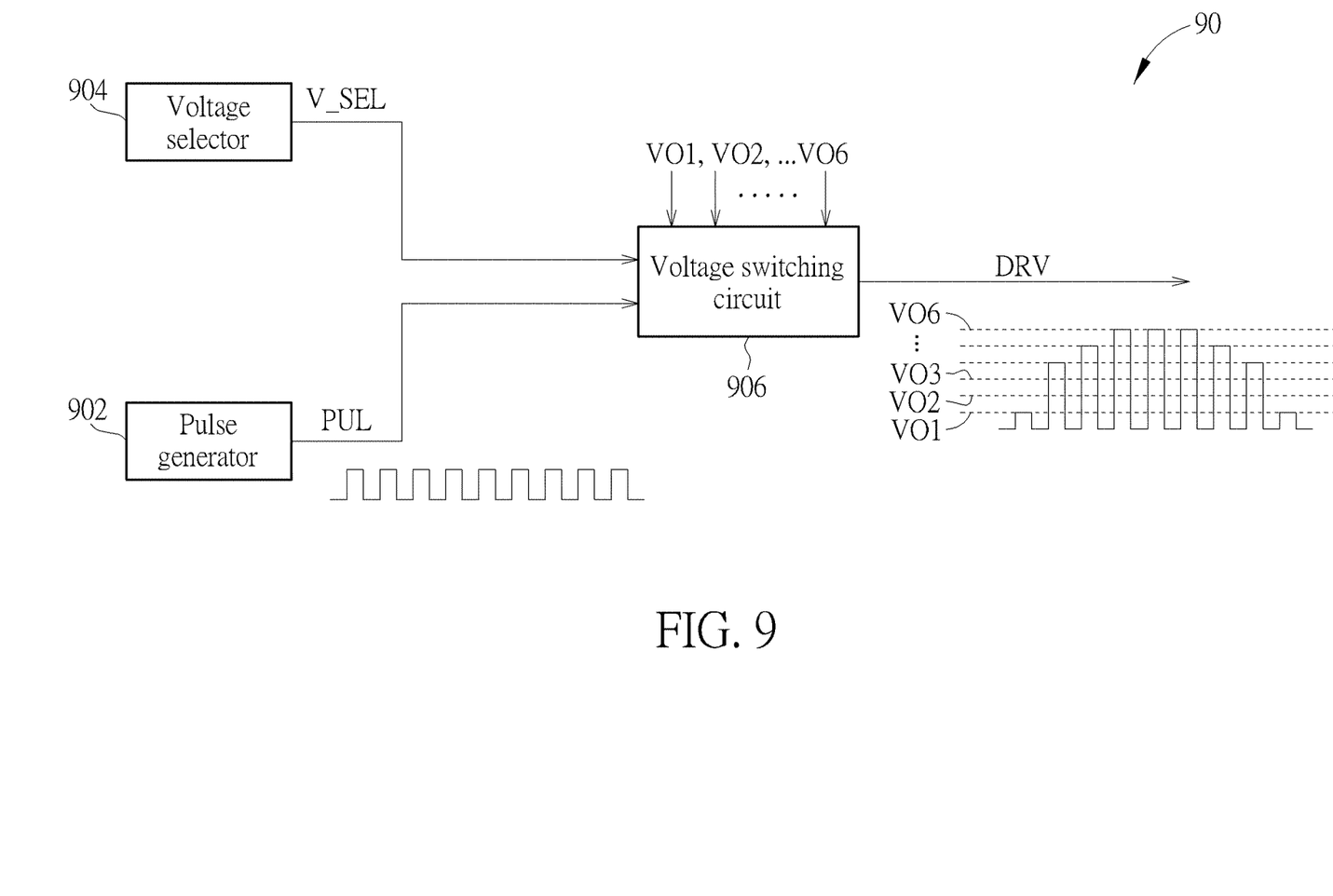

Please note that the touch driving signal with gradually rising and falling amplitude may be realized in other manner. Please refer to FIG. 9, which is a schematic diagram of another touch control circuit 90 according to an embodiment of the present invention. As shown in FIG. 9, the touch control circuit 90 includes a pulse generator 902, a voltage selector 904 and a voltage switching circuit 906. The pulse generator 902 is configured to generate a pulse signal PUL having a series of pulses. The voltage selector 904 is configured to output voltage select signals V_SEL. The voltage switching circuit 906, which is coupled to the pulse generator 902 and the voltage selector 904, may receive the pulse signal PUL from the pulse generator 902 and receive the voltage select signals V_SEL from the voltage selector 904 to generate the touch driving signal DRV. The touch driving signal DRV may have a series of pulses corresponding to the pulses of the pulse signal PUL, where the voltage level of each pulse of the touch driving signal DRV is determined according to the corresponding voltage select signal V_SEL.

For example, the voltage switching circuit 906 may be configured with several voltage candidates (e.g., VO1-VO6), and the amplitude of each pulse of the touch driving signal DRV output by the voltage switching circuit 906 is selected from one of the voltage candidates VO1-VO6 based on the voltage select signals V_SEL. In an embodiment, the voltage select signals V_SEL may have a sequence of periodic values that instruct the voltage switching circuit 906 to select an appropriate voltage for each pulse. Alternatively, the voltage selector 904 may include a counter, which outputs a counting result as the voltage select signals V_SEL to the voltage switching circuit 906, and the voltage switching circuit 906 may select a voltage value corresponding to the counting result for each pulse. As a result, the signal pulses with gradually rising and falling amplitude for the touch driving signal DRV may be generated based on the voltage select signals V_SEL.

Figure 10:
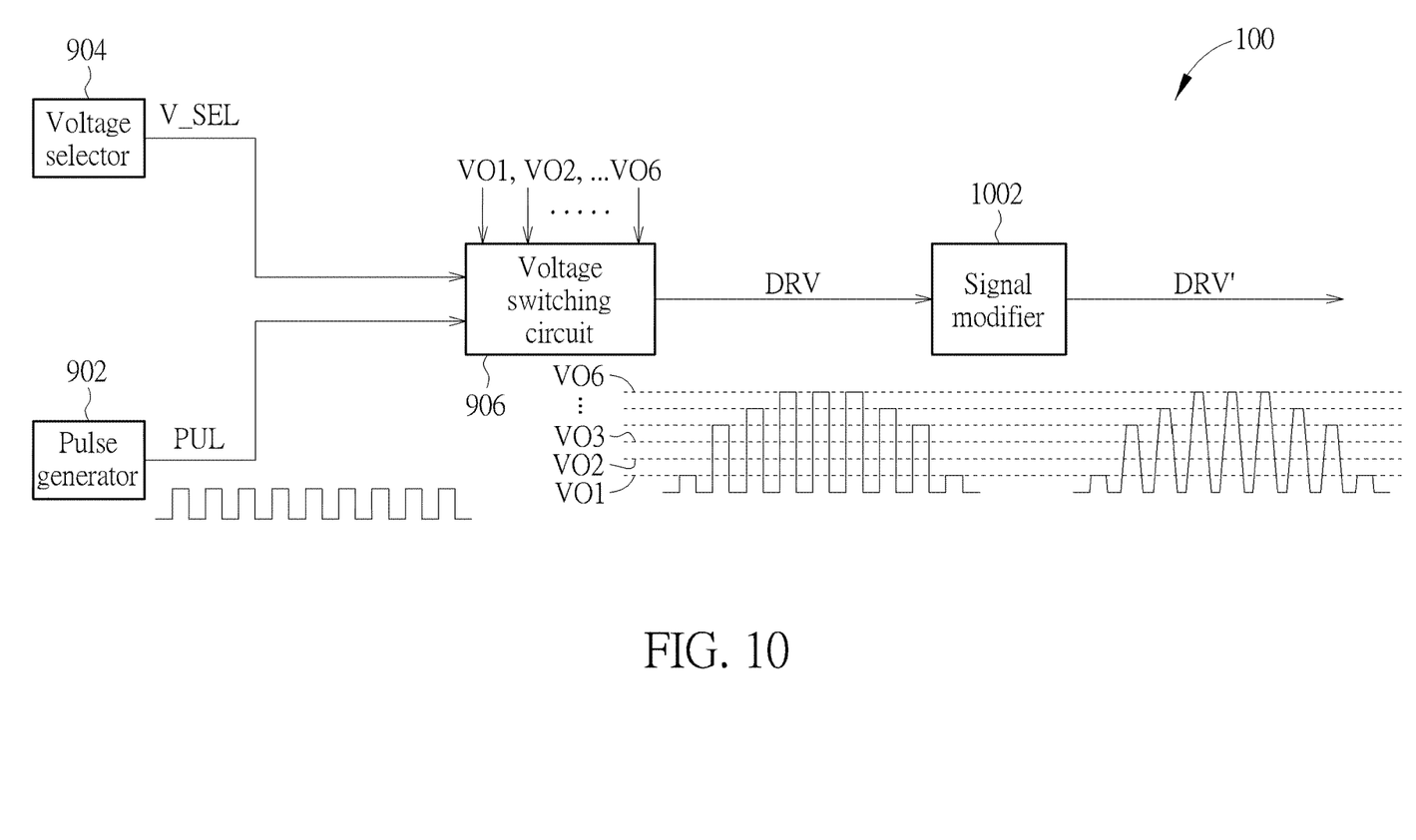

Please note that the rising and falling edges of the pulses in the touch driving signal DRV may still cause non-ignorable EMI energies. In order to solve this problem, the touch driving signal DRV needs to be further processed. Please refer to FIG. 10, which is a schematic diagram of a further touch control circuit 100 according to an embodiment of the present invention. As shown in FIG. 10, the circuit structure of the touch control circuit 100 is similar to the circuit structure of touch control circuit 90, so signals and elements having similar functions are denoted by the same symbols. The difference between the touch control circuit 100 and the touch control circuit 90 is that, the touch control circuit 100 further includes a signal modifier 1002. The signal modifier 1002 is coupled to the output terminal of the voltage switching circuit 906, for smoothing the rising edge and/or the falling edge of each pulse of the touch driving signal DRV to generate the touch driving signal DRV'.

As shown in FIG. 10, in the touch driving signal DRV', not only the amplitude of the pulses rises and falls gradually and slowly, the rising and falling speed of each pulse may also be decreased. In an embodiment, the signal modifier 1002 may include a low-pass filter capable of making the rising and falling edges smoother. Alternatively or additionally, the signal modifier 1002 may include a slew rate controller, which is capable of decreasing the rising and falling speed of the pulses. In an embodiment, the slew rate controller may be implemented with an operational amplifier, where the operational amplifier may be configured with a lower slew rate or driving capability, so as to output the touch driving signal DRV' having the pulses with smoother rising and falling edges.

The touch control circuits 80, 90 and 100 may be implemented in an integrated circuit (IC), which may be a touch driver IC having touch driving and sensing functions, or a touch and display driver integration (TDDI) IC capable of both touch driving/sensing functions and display functions. The detailed operations of performing touch driving and sensing using the touch driving signal are well known by a person of ordinary skill in the art, and will not be narrated herein.

Please note that the present invention aims at providing a touch driving signal for a touch panel, where the amplitude of the touch driving signal rises and falls gradually. Those skilled in the art may make modifications and alterations accordingly. For example, the method for reshaping the touch driving signal to have gradually rising and falling amplitude may be applied to those signals for self-capacitive touch sensing and/or those signals for mutual-capacitive touch sensing. In addition, in the above embodiments, FIGS. 4-7 illustrate several patterns of the envelope applied to the touch driving signal, and these patterns may be used collaboratively based on the allocations of the touch periods. In an embodiment, the rising and falling of the amplitude of the touch driving signal may be asymmetric. For example, the rising and falling of amplitude of a touch driving signal may follow different functions. In an embodiment, the amplitude of the touch driving signal may rise slowly but fall rapidly, or rise rapidly but fall slowly. In another embodiment, the amplitude of the touch driving signal may start to rise slowly at the start of a touch period, and keep at the maximum level until the end of the touch period without falling. Alternatively, the amplitude of the touch driving signal may start from the maximum level without rising at the start of a touch period, and fall slowly at the end of the touch period.

It should also be noted that the touch driving signal of the present invention may be applied to any type of touch panel. In an embodiment, the touch panel may be a panel integrated with touch and display functions, where the touch and display operations are performed based on time division. In another embodiment, the touch panel may be a touch pad without display function. For example, on a vehicle's main control panel having touch sensing function, the touch driving signal may be applicable to the active area of the panel, and also applicable to the button(s) in the border area of the panel.

Figure 11:
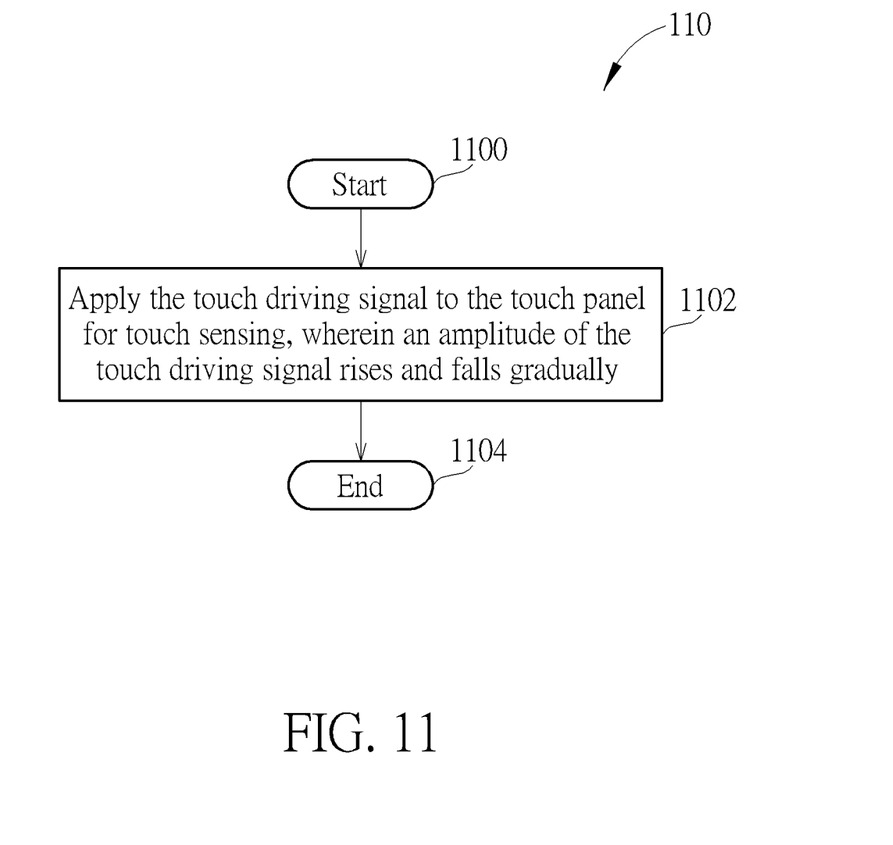
FIG. 11 is a flowchart of a touch driving process according to an embodiment of the present invention.

The abovementioned operations of outputting the touch driving signal may be summarized into a touch driving process 110, as shown in FIG. 11. The touch driving process 110 may be realized in a touch driving circuit, such as the touch driving circuit 80, 90 or 100 as illustrated above, where the touch driving circuit is configured to control the touch operations of a touch panel by outputting the touch driving signal. As shown in FIG. 11, the touch driving process 110 includes the following steps:

Step 1100: Start.

Step 1102: Apply the touch driving signal to the touch panel for touch sensing, wherein an amplitude of the touch driving signal rises and falls gradually.

Step 1104: End.

The detailed implementations and alterations of the touch driving process 110 are described in the above paragraphs, and will not be repeated herein.

To sum up, the present invention provides a method of generating and outputting a touch driving signal, where the touch driving signal may be applied to a touch panel for performing touch sensing. The amplitude of the touch driving signal may rise and fall gradually and slowly, so as to reduce the EMI energies generated from the touch driving signal. In an embodiment, the touch driving signal may be generated by combining a general touch driving signal having high-speed signal swing with an envelope, allowing the amplitude of the touch driving signal to rise gradually in the front part of a touch period and fall gradually in the back part of the touch period. The touch driving signal may be generated from a touch control circuit. In an embodiment, the touch control circuit may be implemented with a digital control circuit and a DAC, where the digital control circuit may include an NCO for generating a discrete periodic signal representing the high-frequency signal swing and another NCO for generating a discrete periodic signal representing the envelope. The output results of the NCOs are combined and then converted by the DAC to generate the touch driving signal. In another embodiment, the touch control circuit may be implemented with a pulse generator that generates a pulse signal. Each pulse of the pulse signal is further provided with a voltage level based on a voltage selector, so as to generate the touch driving signal having gradually rising and falling amplitude. The slow variations applied on the amplitude of the touch driving signal will effectively improve the EMI problems on the touch panel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for driving a touch panel, comprising:
outputting, by a touch control circuit, a touch driving signal to the touch panel for touch sensing, the touch driving signal having a plurality of pulses, each of the plurality of pulses having a peak;
wherein absolute values of amplitudes of the peaks increase and decrease gradually in a touch period; and
wherein the peaks of the plurality of pulses have different absolute values of the amplitudes.

2. The method of claim 1, wherein the touch driving signal comprises a plurality of sinusoidal waves or square waves output through a same channel, and at least two of the plurality of sinusoidal waves or square waves have different levels.

3. The method of claim 1, wherein the absolute values of the amplitudes of the peaks increase gradually in a front part of a time period, and decrease gradually in a back part of the time period.

4. The method of claim 3, wherein the time period is a time slot comprised in the touch period for outputting the touch driving signal to the touch panel.

5. The method of claim 3, wherein the time period is the touch period for outputting the touch driving signal to the touch panel allocated between two display periods in which display data are output.

6. The method of claim 3, wherein the time period comprises a plurality of time slots allocated to output the touch driving signal, wherein the absolute values of the amplitudes of the peaks increase gradually in a first time slot among the plurality of time slots and decrease gradually in a second time slot among the plurality of time slots.

7. The method of claim 1, wherein the absolute values of the amplitudes of the peaks decrease gradually in a front part of a time period, and increase gradually in a back part of the time period.

* * * * *